United States Patent

Poirier et al.

(10) Patent No.: US 11,398,143 B2
(45) Date of Patent: Jul. 26, 2022

(54) INTELLIGENT EMERGENCY EVACUATION SYSTEM

(71) Applicant: ABB Schweiz AG, Baden (CH)

(72) Inventors: Christian Poirier, Saint-Leonard (CA); Marc Rondeau, Laval (CA); Sarwarul Chowdhury, Montreal (CA)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 17/006,803

(22) Filed: Aug. 29, 2020

(65) Prior Publication Data

US 2020/0402376 A1 Dec. 24, 2020

Related U.S. Application Data

(62) Division of application No. 16/042,686, filed on Jul. 23, 2018, now Pat. No. 10,803,715.

(51) Int. Cl.
*G08B 7/00* (2006.01)
*G08B 7/06* (2006.01)
*G08B 29/02* (2006.01)

(52) U.S. Cl.
CPC .............. *G08B 7/062* (2013.01); *G08B 29/02* (2013.01)

(58) Field of Classification Search
CPC ......... G08B 7/062; G08B 29/02; G08B 7/066
See application file for complete search history.

(56) References Cited

U.S. PATENT DOCUMENTS

| 3,728,705 A * | 4/1973 | Atkins ................ B60Q 11/005 340/642 |
| 4,531,114 A | 7/1985 | Topol et al. |
| 4,945,280 A | 7/1990 | Beghelli |
| 4,977,353 A | 12/1990 | Helal et al. |
| 5,148,158 A | 9/1992 | Shah |
| 6,010,228 A | 1/2000 | Blackman et al. |
| 6,529,128 B2 | 3/2003 | Weng |
| 6,538,568 B2 | 3/2003 | Conley, III |
| 6,577,136 B1 | 6/2003 | Marques |
| 6,838,997 B1 | 1/2005 | Davidson |
| 6,896,388 B2 | 5/2005 | George et al. |
| 7,026,768 B1 * | 4/2006 | Ruiz .................... G08B 7/066 315/185 R |
| 7,259,656 B1 * | 8/2007 | Wright .................. G01C 21/20 340/286.14 |

(Continued)

FOREIGN PATENT DOCUMENTS

| CN | 204005659 U | 12/2014 |
| CN | 105927919 A | 9/2016 |

(Continued)

OTHER PUBLICATIONS

Canadian Intellectual Property Office, International Search Report and Written Opinion for PCT/CA2019/000108, dated Nov. 8, 2019, 15 pages.

*Primary Examiner* — Ojiako K Nwugo
(74) *Attorney, Agent, or Firm* — Armstrong Teasdale LLP

(57) ABSTRACT

Technologies for an emergency evacuation system include a system operator and one or more emergency lighting units located in a building. Each emergency lighting unit further includes a processor, communication circuitry configured to communicate with the system operator, and a light indicator configured to be illuminated to indicate an exit of the building.

13 Claims, 5 Drawing Sheets

(56) References Cited

U.S. PATENT DOCUMENTS

| | | |
|---|---|---|
| 7,262,692 B2 | 8/2007 | Ho |
| 7,400,226 B2 | 7/2008 | Barrieau et al. |
| 7,528,700 B2 | 5/2009 | Picard et al. |
| 7,619,538 B1* | 11/2009 | Zarian .................. G08B 7/066 |
| | | 340/326 |
| 7,961,089 B2 | 6/2011 | McSheffrey et al. |
| 7,999,666 B2 | 8/2011 | Barrieau et al. |
| 8,183,989 B2* | 5/2012 | Tsai ...................... G08B 7/066 |
| | | 340/330 |
| 8,279,574 B2 | 10/2012 | Scoggins et al. |
| 8,422,987 B2 | 4/2013 | Kane et al. |
| 8,491,159 B2 | 7/2013 | Recker et al. |
| 8,774,707 B2 | 7/2014 | Flammer et al. |
| 8,786,189 B2 | 7/2014 | Mayfield et al. |
| 8,896,427 B1* | 11/2014 | Ramirez ................ G08B 7/062 |
| | | 340/286.05 |
| 9,247,625 B2 | 1/2016 | Recker et al. |
| 9,252,632 B2 | 2/2016 | Lewis |
| 9,277,632 B2* | 3/2016 | Hegarty .................... H02J 9/02 |
| 9,413,194 B2 | 8/2016 | McCullough et al. |
| 9,541,625 B2 | 1/2017 | McSheffrey |
| 9,655,217 B2 | 5/2017 | Recker et al. |
| 9,679,448 B2 | 6/2017 | Koosha et al. |
| 9,691,307 B2 | 6/2017 | Braunstein |
| 9,755,455 B2 | 9/2017 | Schmucki |
| 9,883,568 B2 | 1/2018 | Han et al. |
| 10,026,278 B1* | 7/2018 | Asaro .................... G08B 7/062 |
| 10,803,715 B2 | 10/2020 | Poirier |
| 2004/0263340 A1* | 12/2004 | Pearson, Jr. ....... H02J 13/00018 |
| | | 340/641 |
| 2006/0139161 A1* | 6/2006 | Beghelli ............. G08B 25/009 |
| | | 340/514 |
| 2006/0261971 A1 | 11/2006 | Danvir et al. |
| 2007/0275750 A1 | 11/2007 | Nakagawa |
| 2008/0197790 A1 | 8/2008 | Mangiaracina et al. |
| 2010/0019901 A1* | 1/2010 | Tsai ...................... G08B 7/066 |
| | | 340/540 |
| 2010/0302048 A1 | 12/2010 | Mahajan |
| 2011/0148193 A1* | 6/2011 | Reid ...................... H05B 47/18 |
| | | 307/18 |
| 2011/0148302 A1 | 6/2011 | Keller et al. |
| 2011/0148309 A1* | 6/2011 | Reid .................... H05B 47/175 |
| | | 315/159 |
| 2012/0143357 A1* | 6/2012 | Chemel ................ H05B 47/115 |
| | | 700/90 |
| 2014/0145623 A1* | 5/2014 | McCullough ............. H02J 9/02 |
| | | 315/159 |
| 2014/0167969 A1 | 6/2014 | Wedig et al. |
| 2014/0320011 A1* | 10/2014 | Hegarty .................. H02J 9/062 |
| | | 315/86 |
| 2014/0340222 A1 | 11/2014 | Thornton et al. |
| 2015/0091451 A1* | 4/2015 | Williams ........... H01R 33/9453 |
| | | 315/160 |
| 2016/0027267 A1* | 1/2016 | Spiro ........................ H02J 9/06 |
| | | 340/517 |
| 2016/0240056 A1* | 8/2016 | Chen .................... G08B 13/193 |
| 2017/0079111 A1 | 3/2017 | Rezeanu et al. |
| 2017/0093208 A1 | 3/2017 | Sabnis et al. |
| 2017/0094134 A1* | 3/2017 | Lunn .................... H04N 5/2252 |
| 2017/0148285 A1* | 5/2017 | Spiro ................... G08B 29/181 |
| 2017/0243527 A1* | 8/2017 | Flieder ................. C09K 11/643 |
| 2018/0049300 A1 | 2/2018 | Recker et al. |
| 2018/0075712 A1* | 3/2018 | Field .................... G08B 25/016 |
| 2018/0084627 A1 | 3/2018 | Recker et al. |
| 2018/0185533 A1* | 7/2018 | Lalicki ...................... A61L 2/24 |
| 2018/0188018 A1* | 7/2018 | Brown .................. H05B 45/357 |
| 2018/0375444 A1* | 12/2018 | Gamroth .................. H04Q 9/00 |
| 2019/0182671 A1* | 6/2019 | Magnan ................ H04L 63/107 |
| 2019/0295386 A1* | 9/2019 | Roberts ................... G09F 13/22 |
| 2019/0309974 A1* | 10/2019 | Kostrun ............. G06K 9/00771 |

FOREIGN PATENT DOCUMENTS

| | | |
|---|---|---|
| CN | 106455190 A | 2/2017 |
| DE | 102013003076 A1 | 6/2014 |
| DE | 202017100331 U1 | 1/2017 |
| EP | 1724903 B1 | 11/2006 |
| FR | 2929461 A1 | 10/2009 |
| GB | 2336258 A | 10/1999 |
| GB | 2494151 A | 3/2013 |
| WO | 2004107966 A2 | 12/2004 |
| WO | 2006116800 A1 | 11/2006 |
| WO | 201289355 A1 | 7/2012 |
| WO | 201478907 A1 | 5/2014 |
| WO | 201697929 A1 | 6/2016 |
| WO | 2016124917 A1 | 8/2016 |
| WO | 2017138029 A1 | 8/2017 |

* cited by examiner

INTELLIGENT EMERGENCY EVACUATION SYSTEM

CROSS-REFERENCE TO RELATED APPLICATION

This application is a divisional of U.S. patent application Ser. No. 16/042,686, entitled "Intelligent Emergency Evacuation System" and filed Jul. 23, 2018, the entire disclosure of which is incorporated herein by reference.

TECHNICAL FIELD

The present disclosure relates generally to emergency evacuation systems and, more particularly, to systems and methods for maintaining and controlling one or more emergency lighting units.

BACKGROUND

Emergency lighting units are typically located in stairwells, hallways, or other locations of a building to guide occupants of the building and/or first responders to an exit of the building. As such, failure of the emergency lighting units may be hazardous during emergencies.

SUMMARY

According to one aspect of the disclosure, an emergency evacuation system includes a system operator and one or more emergency lighting units located in a building. Each emergency lighting unit further includes a processor, communication circuitry configured to communicate with the system operator, and a light indicator configured to be illuminated to indicate an exit of the building.

In some embodiments, each emergency lighting unit further includes a load sensor configured to generate load sensor data indicative of an electrical load of the light indicator of that emergency lighting unit.

In some embodiments, the processor is configured to detect a failure of the light indicator of that emergency lighting unit based on the load sensor data.

In some embodiments, the communication circuitry is configured to transmit a maintenance notification indicating the failure of the light indicator of that emergency lighting unit to the system operator.

In some embodiments, each emergency lighting unit further includes an visual sensor configured to capture motion data indicative of movement of one or more occupants present in an environment of the emergency lighting unit.

In some embodiments, wherein the processor of each emergency lighting unit is configured to evaluate the motion data from the visual sensor of that emergency lighting unit and to update an occupancy counter associated with that emergency lighting unit.

In some embodiments, the occupancy counter is representative of a number of occupants present in the environment of that emergency lighting unit.

In some embodiments, to evaluate the motion data includes to evaluate the motion data to determine a direction of movement of each of the one or more occupants indicative of whether each occupant is entering or exiting the building.

In some embodiments, each emergency lighting unit is configured to transmit the occupancy counter to the system operator, and wherein the system operator is configured to determine a total number of occupants present in the building based on a plurality of occupancy counters received from a plurality of emergency lighting units of the emergency evacuation system.

In some embodiments, each emergency lighting unit further includes an audio indicator configured to play an audio alert message in response to receiving an audio command from the system operator.

In some embodiments, each emergency lighting unit further includes a memory storing a plurality of audio alert message files, each audio alert message file being associated with a different audio command to be received from the system operator.

According to another aspect, a method of detecting failure of an emergency lighting unit is disclosed. The method includes obtaining load sensor data generated by a load sensor of the emergency lighting unit, wherein the load sensor data is indicative of an electrical load of a light indicator of the emergency lighting unit that is illuminated to indicate an exit of a building; evaluating, by a processor of the emergency lighting unit, the load sensor data to monitor the electrical load of the light indicator; detecting, by the processor, a light indicator failure in response to determining that a level of the electric load is below a threshold; and transmitting a maintenance notification to a system operator in response to detecting the light indicator failure.

According to another aspect, a method of monitoring occupancy with an emergency lighting unit includes a light indicator illuminated to indicate an exit of a building. The method includes obtaining motion data generated by an visual sensor of the emergency lighting unit, wherein the motion data is indicative of movement of one or more occupants present in an environment of the emergency lighting unit; evaluating, by a processor of the emergency lighting unit, the motion data to monitor the environment of the light indicator; updating, by the processor, an occupancy counter based on the evaluation of the motion data; and transmitting the occupancy counter to a system operator in response to updating the occupancy counter.

In some embodiments, the occupancy counter is representative of a number of occupants present in the environment of that emergency lighting unit.

In some embodiments, evaluating the motion data includes determining a direction of the movement of each of the one or more occupants, and wherein updating the occupancy counter includes incrementing the occupancy counter in response to determining a direction of movement indicative of an occupant entering the building.

In some embodiments, evaluating the motion data includes determining a direction of the movement of each of the one or more occupants, and wherein updating the occupancy counter includes decrementing the occupancy counter in response to determining a direction of movement indicative of an occupant exiting the building.

In some embodiments, the method further includes determining, by the system operator, a total number of occupants present in the building based on a plurality of occupancy counters received from a plurality of emergency lighting units located in the building.

According to another aspect, a method of broadcasting an audio alert message in a building using a plurality of emergency lighting units is disclosed. Each of the plurality of emergency lighting units includes a light indicator illuminated to indicate an exit of the building. The method includes receiving, by each of the plurality of emergency lighting units, an audio command from a system operator and playing, by each of the plurality of emergency lighting units, an audio alert message associated with the audio command in response to receiving the audio command.

In some embodiments, each of the plurality of emergency lighting units further includes a memory storing a plurality of audio alert message files, each audio alert message file being associated with a different audio command to be received from the system operator.

In some embodiments, the method further includes receiving, by each of the plurality of emergency lighting units, a new audio alert message file from the system operator and storing, by each of the plurality of emergency lighting units, the new audio alert message file in the memory of that emergency lighting unit.

BRIEF DESCRIPTION OF THE DRAWINGS

The detailed description particularly refers to the following figures, in which.

DETAILED DESCRIPTION OF THE DRAWINGS

Figure 1:
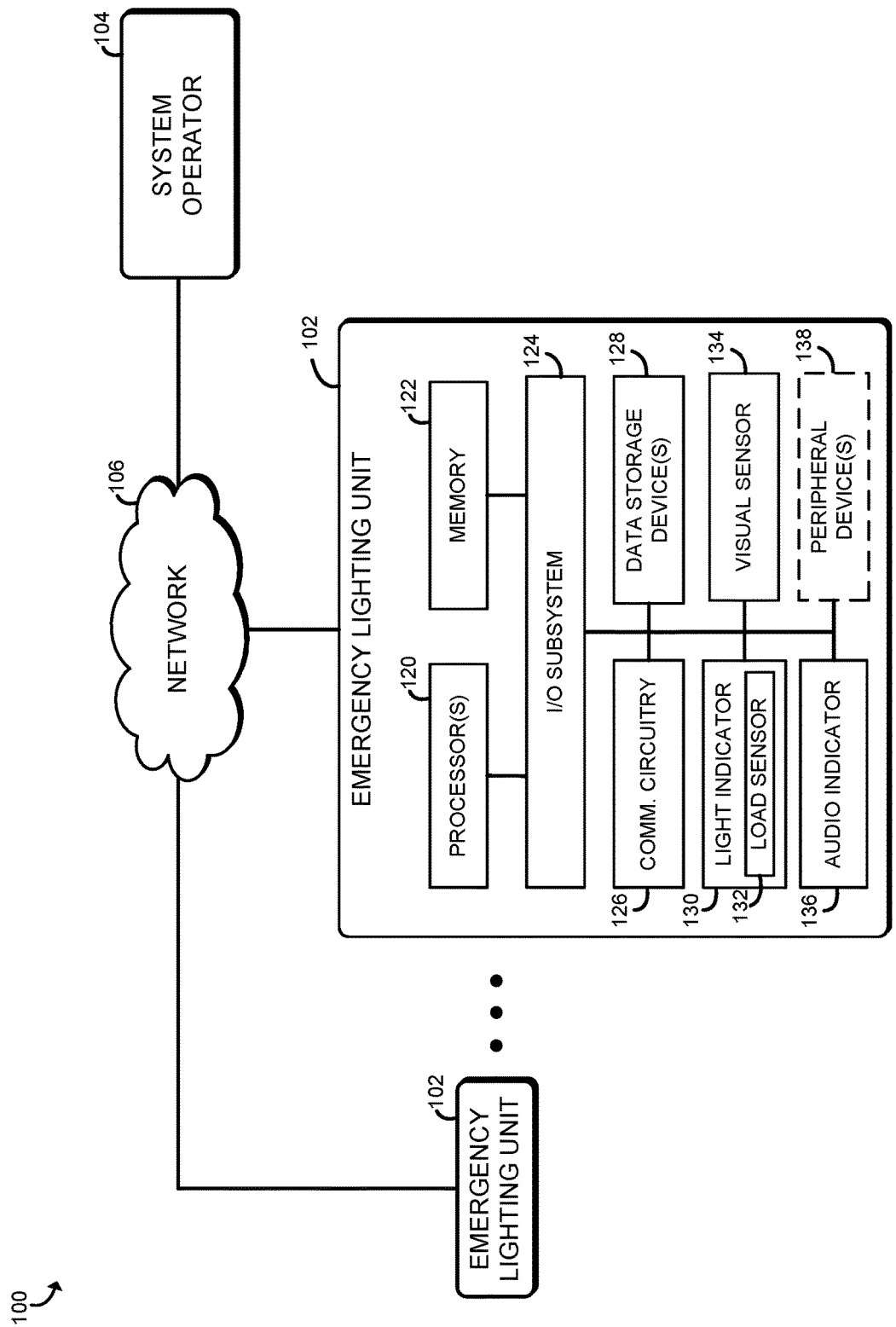
FIG. 1 is a simplified block diagram of at least one embodiment of an emergency evacuation system of a building including at least one emergency lighting unit and a system operator.

While the concepts of the present disclosure are susceptible to various modifications and alternative forms, specific embodiments thereof have been shown by way of example in the figures and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

The disclosed embodiments may be implemented, in some cases, in hardware, firmware, software, or any combination thereof. The disclosed embodiments may also be implemented as instructions carried by or stored on a transitory or non-transitory computer-readable storage medium, which may be read and executed by one or more processors. A computer-readable storage medium may be embodied as any storage device, mechanism, or other physical structure for storing or transmitting information in a form readable by a computing device (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, an emergency evacuation system 100 for maintaining and controlling at least one emergency lighting unit 102 includes one or more emergency lighting units 102 that are each communicatively coupled to a system operator 104 via a network 106. In use, each emergency lighting unit 102 has a light indicator 130 (e.g., an illuminated "EXIT" symbol) that illuminates to guide persons (e.g., occupants and/or first responders) present in the building to an exit of the building. In the illustrative embodiment, the light indicator 130 is illuminated at all times. However, it should be appreciated that, in some embodiments, the light indicator 130 may be illuminated only during certain time periods and/or during emergency events. As discussed further below, each emergency lighting unit 102 includes various features. It should be appreciated that each emergency lighting unit 102 may include more or less than the features described herein.

For example, the emergency lighting units 102 may be configured to detect light indicator failures. To do so, each emergency lighting unit 102 may include a load sensor 132 that is configured to monitor an electric current flow to detect a disturbance in the current flow (e.g., due to a short or open circuit) in that emergency lighting unit 102. In response to a detection of the disturbance, the emergency lighting unit 102 may be configured to transmit a notification to the system operator 104 indicating a presence of a light indicator failure.

Additionally or alternatively, in some embodiments, the emergency lighting units 102 may be configured to track occupants present in the building. To do so, each emergency lighting unit 102 may include a visual sensor 134 that captures motion data indicative of movement in and out of the exit or a pathway to the exit of the building where the emergency lighting unit 102 is located. For example, in some embodiments, the visual sensor 134 may be embodied as a motion-activated camera that activates in response to detecting a motion to capture movement of a person that triggered the motion activation. The emergency lighting unit 102 may analyze the captured motion data to determine a direction of the movement of the detected person to update an occupancy counter to keep track of a number of occupants entering and leaving the environment where the emergency lighting unit 102 is located. Subsequently, the occupancy counter from each emergency lighting unit 102 of the building may be transmitted to the system operator 104 to be analyzed to determine a total number of occupants present in the building. In some embodiments, the system operator 104 may further determine a number of occupants present on each floor or in each room based on the corresponding locations of the emergency lighting units 102. In other embodiments, the motion data may be transmitted to the system operator 104, and the system operator 104 may analyze the motion data and update the total of number of occupants present in the building.

Additionally or alternatively, the emergency lighting units 102 may be configured to play an audio alert message that is stored in each of the emergency lighting units 102. To do so, each emergency lighting unit 102 includes an audio indicator 136. In such embodiments, each emergency lighting unit 102 may receive one or more audio alert messages to be stored in the emergency lighting units 102. The emergency lighting units 102 may further receive an audio command from the system operator 104 to play an audio alert message associated with the audio command. For example, the system operator 104 may transmit a command to play a fire alarm alert message. In response, each emergency lighting unit 102 may play the fire alarm alert message to inform the occupants who are present in the building to evacuate the building using the stairs. The audio alert message may also include directions to a nearest exit (which may be specific to the each emergency lighting unit 102).

As described above, the emergency lighting unit 102 and the system operator 104 are illustratively in communication via the network 106, which may be embodied as any type of wired or wireless communication network, including global networks (e.g., the Internet), local area networks (LANs) or wide area networks (WANs), cellular networks (e.g., Global System for Mobile Communications (GSM), 3G, 4G, 5G, Long Term Evolution (LTE), Worldwide Interoperability for Microwave Access (WiMAX), etc.), digital subscriber line (DSL) networks, cable networks (e.g., coaxial networks, fiber networks, etc.), or any combination thereof.

In the illustrative embodiment, each emergency lighting unit 102 includes at least one processor 120, at least one memory 122, an input/output ("I/O") subsystem 124, communication circuitry 126, at least one data storage device 128, at least one light indicator 130, at least one visual sensor 134, and at least one audio indicator 136. It should be appreciated that, in some embodiments, the emergency lighting unit 102 may also include any number of additional input/output devices, interface devices, and/or other peripheral devices 138. For example, in some embodiments, the peripheral devices 138 may include a touch screen, graphics circuitry, keyboard, mouse, network interface, and/or other input/output devices, interface devices, and/or other peripheral devices. Additionally, in some embodiments, one or more of the illustrative components may be incorporated in, or otherwise form a portion of, another component.

The processor 120 may be embodied as any type of processor capable of performing the functions described herein. For example, the processor 120 may be embodied as a single or multi-core processor(s), digital signal processor, microcontroller, or other processor or processing/controlling circuit.

The memory 122 may be embodied as any type of volatile (e.g., dynamic random access memory (DRAM), etc.) or non-volatile memory or data storage capable of performing the functions described herein. Volatile memory may be a storage medium that requires power to maintain the state of data stored by the medium. Non-limiting examples of volatile memory may include various types of random access memory (RAM), such as dynamic random access memory (DRAM) or static random access memory (SRAM). One particular type of DRAM that may be used in a memory module is synchronous dynamic random access memory (SDRAM). Such standards (and similar standards) may be referred to as DDR-based standards and communication interfaces of the storage devices that implement such standards may be referred to as DDR-based interfaces.

The memory 122 is communicatively coupled to the processor 120 via the I/O subsystem 124, which may be embodied as circuitry and/or components to facilitate input/output operations with the processor 120, the memory 122, and other components of the emergency lighting unit 102. For example, the I/O subsystem 124 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some embodiments, the I/O subsystem 124 may form a portion of a system-on-a-chip (SoC) and be incorporated, along with one or more of the processor 120, the memory 122, and other components of the emergency lighting unit 102, on a single integrated circuit chip.

The communication circuitry 126 may be embodied as any communication circuit, device, or collection thereof, capable of enabling communications between the emergency lighting unit 102 and another compute device (e.g., the system operator 104 and/or another emergency lighting unit 102 over the network 106). The communication circuitry 126 may be configured to use any one or more communication technology (e.g., wired or wireless communications) and associated protocols (e.g., Ethernet, Bluetooth®, Wi-Fi®, WiMAX, etc.) to effect such communication.

The data storage 128 may be embodied as any type of device or devices configured for short-term or long-term storage of data such as, for example, memory devices and circuits, memory cards, hard disk drives, solid-state drives, or other data storage devices. In the illustrative embodiment, the emergency lighting unit 102 may be configured to store registered motion data, occupancy counter, and/or alert messages in the data storage 128 as discussed in more detail below. This data storage 128 may also be considered and referred to as a "memory."

The light indicator 130 may be embodied as any type of an output device capable of indicating an emergency exit or pathway via illumination. In the illustrative embodiment, the light indicator 130 is embodied as one or more light emitting diodes (LEDs). The light indicator 130 may further include a boost convert to amply an input voltage to drive the LEDs. In the illustrative embodiment, the light indicator 130 further includes a load sensor 132. The load sensor 132 may be embodied as any type of sensor capable of generating or producing load sensor data indicative of an electrical load of the light indicator 130 to detect a failure of the LEDs (or other light source) of the light indicator 130. More specifically, the load sensor data is configured to monitor an electric current flow to detect a light indicator failure indicated by a disturbance in the current flow (e.g., due to a short or open circuit) in the light indicator 130.

The visual sensor 134 may be embodied as any type of sensor capable of generating or producing motion data to detect movement of a person and track a number of people entering and exiting an environment of the emergency lighting unit 102 (e.g., a room, a floor, or, if a building has only one exit, the building). In the illustrative embodiment, the visual sensor 134 is embodied as a camera capable of recording video and/or still images.

The audio indicator 136 may be embodied as any type of an output device capable of playing an audio alert message file. In the illustrative embodiment, the audio indicator 136 is embodied as a speaker.

Figure 2:
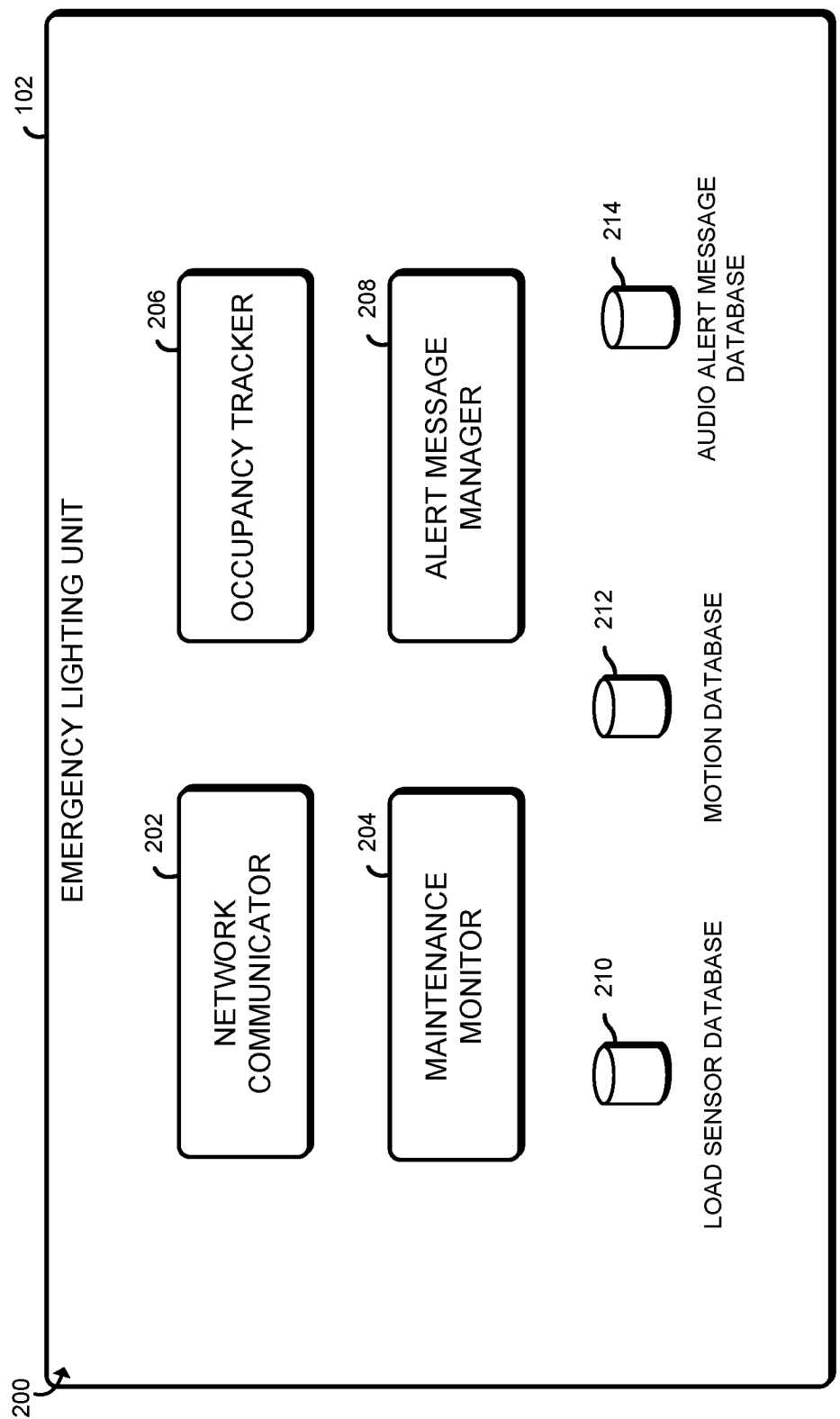
FIG. 2 is a simplified block diagram of at least one embodiment of the emergency lighting unit of FIG. 1.

Referring now to FIG. 2, in the illustrative embodiment, the emergency lighting unit 102 may establish an environment 200 during operation. The illustrative environment 200 includes a network communicator 202, a maintenance monitor 204, an occupancy tracker 206, and an alert message manager 208. In the illustrative environment 200, the network communicator 202, which may be embodied as hardware, firmware, software, virtualized hardware, emulated architecture, and/or a combination thereof as discussed above, is configured to facilitate inbound and outbound network communications to and from the emergency lighting unit 102, respectively. For example, the network communicator 202 may be configured to transmit a notification to the system operator 104 indicating a light indicator failure. Additionally or alternatively, the network communicator 202 may be configured to transmit an occupancy counter to the system operator 104, such that the system operator 104 may determine a number of occupants present in the building. Additionally or alternatively, the network communicator 202 may be configured to receive an audio command from the system operator 104 indicating which audio alert message file to be played. Accordingly, in some embodiments, at least a portion of the functionality of the network communicator 202 may be performed by the communication circuitry 126.

The maintenance monitor 204, which may be embodied as hardware, firmware, software, virtualized hardware, emulated architecture, and/or a combination thereof is configured to obtain load sensor data generated by the load sensor 132 to monitor an electrical load level of the light indicator 130. In the illustrative embodiment, the load sensor data generated by the load sensor 132 is stored in the load sensor database 210, which may be embodied as a portion of memory or other data storage (e.g., a portion of the memory 122 or data storage 128).

The occupancy tracker 206, which may be embodied as hardware, firmware, software, virtualized hardware, emulated architecture, and/or a combination thereof is configured to analyze motion data captured by the visual sensor 134 to detect movements of occupants present in the environment of the emergency lighting unit 102. Additionally, the occupancy tracker 206 is configured to determine a direction of movement and count the number of people entering and exiting the environment using an image and/or video processing algorithm. Based on the location of the corresponding emergency lighting unit 102, the occupancy tracker 206 of the emergency lighting unit 102 determines whether the determined direction of the movement indicates that the detected occupant is entering or exiting the environment of the emergency lighting unit 102. For example, if the emergency lighting unit 102 is located in a hallway at an exit to the stairwell, the occupancy tracker 206 may determine that a person is exiting the floor if the person is moving toward the emergency lighting unit 102 or entering the floor if the person is moving away from the emergency lighting unit 102. Based on the direction of the movement, the occupancy tracker 206 is configured to update an occupancy counter indicative of a number of occupants present in the environment. It should be appreciated that, in some embodiments, the occupancy counter is only determined and updated at the emergency lighting units 102 that are located at the exit of the building. In such embodiments, the occupancy tracker 206 may determine that a person is exiting the building if the person is moving toward the emergency lighting unit 102 or entering the building if the person is moving away from the emergency lighting unit 102.

It should be appreciated that a plurality of the emergency lighting units 102 are located throughout the building to monitor the overall traffic of people entering and exiting the building. The occupancy counter for each emergency lighting unit 102 is transmitted to the system operator 104 by the network communicator 202 such that the system operator 104 may determine a total number of occupants present in the building. In some embodiments, a number of occupants present on each floor or in each room may be determined based on the locations of the emergency lighting units 102.

In the illustrative embodiment, the motion data produced by the visual sensor 134 and the occupancy counter are stored in the motion database 212, which may be embodied as a portion of memory or other data storage (e.g., a portion of the memory 122 or data storage 128).

The alert message manager 208, which may be embodied as hardware, firmware, software, virtualized hardware, emulated architecture, and/or a combination thereof is configured to play an audio alert message in response to a receipt of a command from the system operator 104. In the illustrative embodiment, the audio alert message files are stored in the audio alert message database 214, which may be embodied as a portion of memory or other data storage (e.g., a portion of the memory 122 or data storage 128). In the illustrative embodiment, a number of audio alert message files are preloaded on the emergency lighting unit 102 from a manufacture. In some embodiments, additional alert message audio files may be received from the system operator 104 to be added to the audio alert message database 214 of the emergency lighting unit 102.

Figure 3:
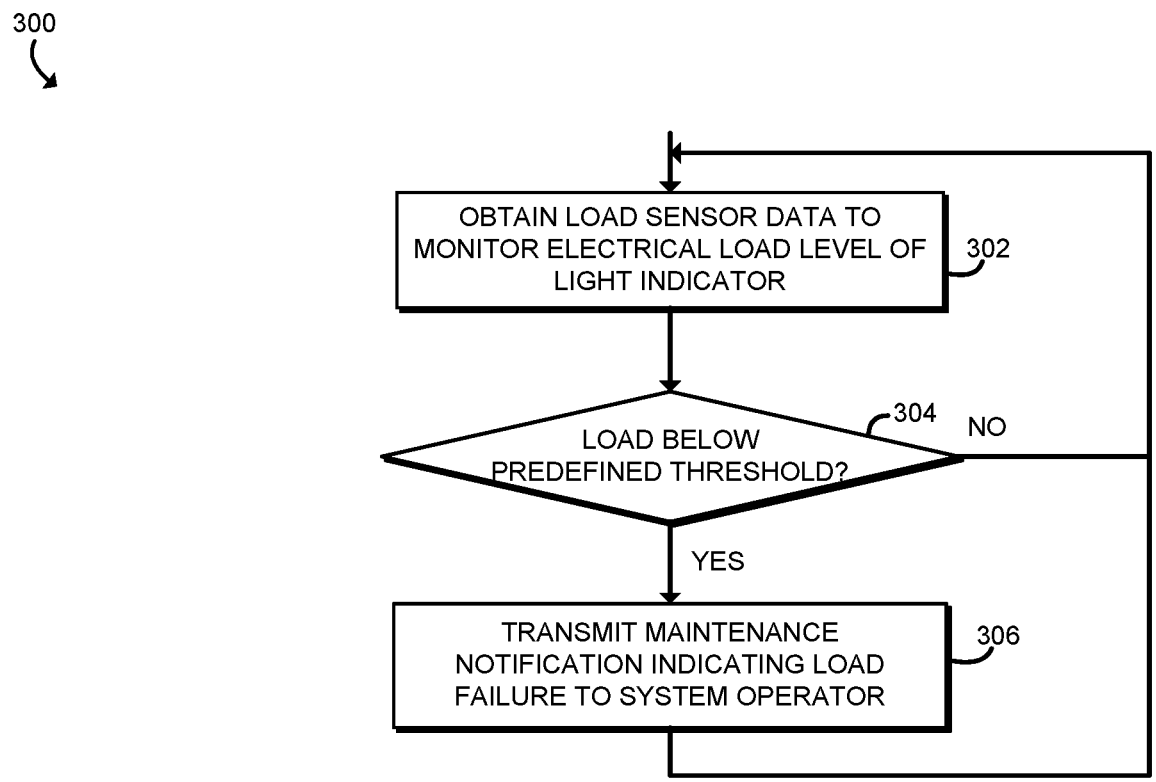
FIG. 3 is a simplified flow diagram of at least one embodiment of a method for detecting failure of the emergency lighting unit that may be executed by the emergency lighting unit of FIG. 1.

Referring now to FIG. 3, in use, the emergency lighting unit 102 may execute a method 300 for detecting a failure of the emergency lighting unit 102. The method 300 begins with block 302, in which the emergency lighting unit 102 obtains the load sensor data to monitor an electrical load level of the light indicator 130 of the emergency lighting unit 102. If the emergency lighting unit 102 determines that the load level is above a threshold in block 304, the method 300 loops back to block 302 to continue monitoring the electrical load of the light indicator 130. The threshold use in block 304 may be predefined.

If, however, the emergency lighting unit 102 determines that the load level is below the threshold in block 304, the emergency lighting unit 102 determines a failure of the light indicator 130 and the method 300 advances to block 306. In block 306, the emergency lighting unit 102 transmits a maintenance notification to the system operator 104 indicating a load failure (i.e., a light indicator failure). Subsequently, the method 300 loops back to block 302 to continue monitoring the electrical load level of the light indicator 130 to determine whether the light indicator failure has been cured. If not, the emergency lighting unit 102 is configured re-transmit a maintenance notification to the system operator 104 to request the light indicator 130 to be fixed.

Figure 4:
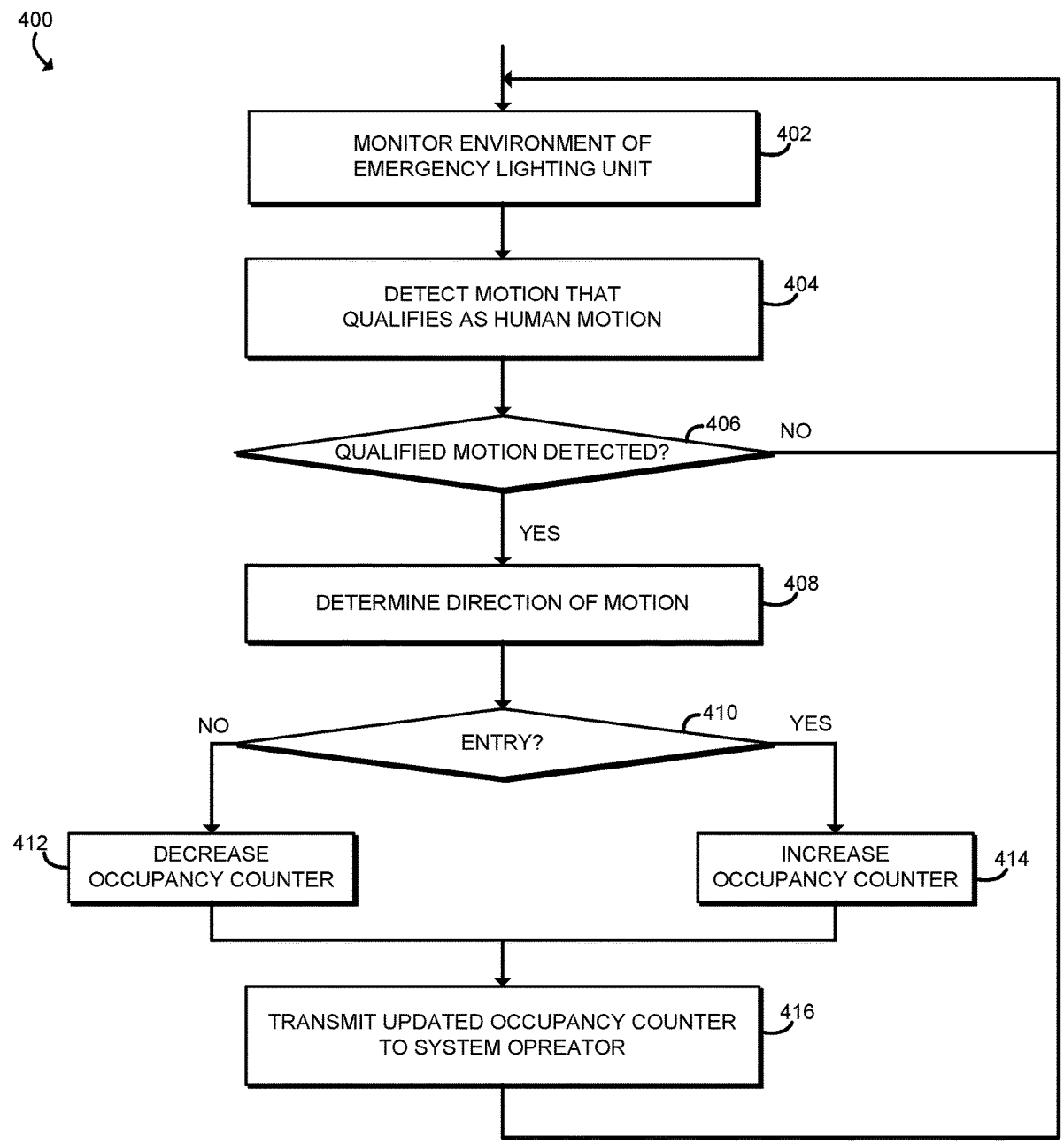
FIG. 4 is a simplified flow diagram of at least one embodiment of a method for monitoring occupancy that may be executed by the emergency lighting unit of FIG. 1.

Referring now to FIG. 4, in use, the emergency lighting unit 102 may execute a method 400 for updating an occupancy counter indicating a number of occupants present in the building. The method 400 begins with block 402, in which the emergency lighting unit 102 monitors the environment of the emergency lighting unit 102.

In block 404, the emergency lighting unit 102 detects a motion that qualifies as a human motion. For example, the emergency lighting unit 102 may use an image and/or video processing algorithm to determine whether the detected motion is caused by movement of a person.

If the emergency lighting unit 102 determines that a qualified motion has not been detected in block 406, the method 400 loops back to block 402 to continue monitoring the environment for a qualified motion. If, however, the emergency lighting unit 102 determines that a qualified motion is detected in block 406, the method 400 advances to block 408.

In block 408, the emergency lighting unit 102 determines a direction of the detected motion. Specifically, the emergency lighting unit 102 determines whether a detected person is entering or exiting the environment of the emergency lighting unit 102 in order to track a number of occupants present in the environment (e.g., a room, a floor, or, if a building has only one exit, the building).

If the emergency lighting unit 102 determines that the detected person is exiting the environment in block 410, the method 400 advances to block 412. In block 412, the emergency lighting unit 102 decreases the occupancy counter. Alternatively, if the emergency lighting unit 102 determines that the detected person is entering the environment in block 410, the method 400 advances to block 414. In block 414, the emergency lighting unit 102 increases the occupancy counter.

In block 416, the emergency lighting unit 102 transmits the updated occupancy counter indicative of the number of occupants presently located in the environment of the emergency lighting unit 102 to the system operator 104. Such information may be used to inform first responders how many people are in the building during emergencies.

Figure 5:
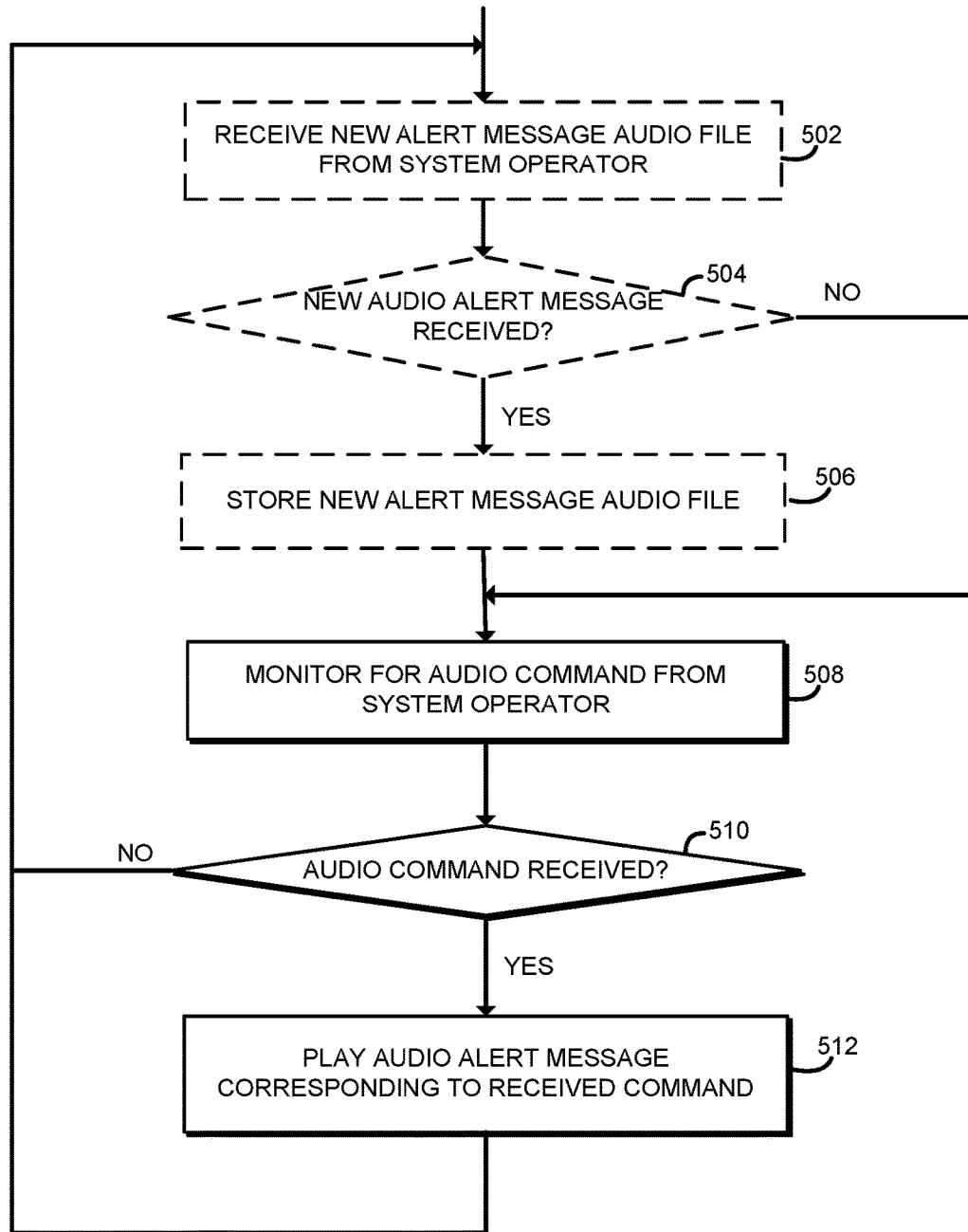
FIG. 5 is a simplified flow diagram of at least one embodiment of a method for broadcasting an audio alert message that may be executed by the emergency lighting unit of FIG. 1.

Referring now to FIG. 5, in use, the emergency lighting unit 102 may execute a method 500 for playing an audio alert message. As discussed above, the standard audio alert message files are stored in the audio alert message database 214 of the emergency lighting unit 102. However, additional audio alert message files may be added. In some embodiments, the method 500 begins with block 502, in which the emergency lighting unit 102 monitors for a new audio alert message file from the system operator 104. If the emergency lighting unit 102 determines that a new audio alert message file has been received, the method 500 advances to block 506, in which the emergency lighting unit 102 stores the received new audio alert message file in the audio alert message database 214 and advances to block 508. If, however, the emergency lighting unit 102 determines that a new audio alert message file has not been received, the method 500 skips ahead to block 508.

In block 508, the emergency lighting unit 102 monitors for an audio command from the system operator 104 to play an audio alert message file. If the emergency lighting unit 102 determines that a command has not been received in block 510, the method 500 loops back to block 502 to continue receiving a new audio alert message file from the system operator 104. If, however, the emergency lighting unit 102 determines that an audio command is received in block 510, the method 500 advances to block 512 to play the audio alert message associated with the received audio command.

While the disclosure has been illustrated and described in detail in the drawings and foregoing description, such an illustration and description is to be considered as exemplary and not restrictive in character, it being understood that only illustrative embodiments have been shown and described and that all changes and modifications that come within the spirit of the disclosure are desired to be protected.

There exist a plurality of advantages of the present disclosure arising from the various features of the method, apparatus, and system described herein. It will be noted that alternative embodiments of the method, apparatus, and system of the present disclosure may not include all of the features described yet still benefit from at least some of the advantages of such features. Those of ordinary skill in the art may readily devise their own implementations of the method, apparatus, and system that incorporate one or more of the features of the present invention and fall within the spirit and scope of the present disclosure as defined by the appended claims.

The invention claimed is:

1. An emergency evacuation system comprising:
a system operator; and
one or more emergency lighting units located in a building, wherein each emergency lighting unit comprises:
a light indicator configured to be illuminated to indicate an exit of the building;
a processor;
communication circuitry configured to communicate with the system operator; and
a visual sensor configured to capture motion data including images indicative of a direction of movement of one or more occupants present in an environment of the emergency lighting unit,
wherein the processor is configured to analyze the motion data including the direction of movement to determine whether the one or more occupants are entering or leaving the environment.

2. The emergency evacuation system of claim 1, wherein the processor of each emergency lighting unit is further configured to update an occupancy counter associated with that emergency lighting unit based on whether the one or more occupants are entering or leaving the environment.

3. The emergency evacuation system of claim 2, wherein the occupancy counter is representative of a number of occupants present in the environment of that emergency lighting unit.

4. The emergency evacuation system of claim 2, wherein to update the occupancy counter associated with that emergency lighting unit comprises to increment the occupancy counter in response to determining the direction of movement indicative of an occupant entering the building.

5. The emergency evacuation system of claim 2, wherein to update the occupancy counter associated with that emergency lighting unit comprises to decrement the occupancy counter in response to determining the direction of movement indicative of an occupant leaving the building.

6. The emergency evacuation system of claim 2, wherein each emergency lighting unit is configured to transmit the occupancy counter to the system operator.

7. The emergency evacuation system of claim 6, wherein the system operator is configured to determine a total number of occupants present in the building based on a plurality of occupancy counters received from a plurality of emergency lighting units of the emergency evacuation system.

8. A method of monitoring occupancy with an emergency lighting unit comprising a light indicator illuminated to indicate an exit of a building, the method comprising:
obtaining motion data generated by a visual sensor of the emergency lighting unit, wherein the motion data includes images indicative of a direction of movement of one or more occupants present in an environment of the emergency lighting unit;
analyzing the motion data including the direction of movement to determine whether the one or more occupants are entering or leaving the environment; and
updating, by the processor, an occupancy counter based on whether the one or more occupants are entering or leaving the environment.

9. The method of claim 8, wherein the occupancy counter is representative of a number of occupants present in the environment of that emergency lighting unit.

10. The method of claim 8, wherein updating the occupancy counter comprises incrementing the occupancy counter in response to determining the direction of movement indicative of an occupant entering the building.

11. The method of claim 8, wherein evaluating the motion data comprises determining the direction of the movement of each of the one or more occupants, and wherein updating the occupancy counter comprises decrementing the occupancy counter in response to determining a direction of movement indicative of an occupant exiting the building.

12. The method of claim 8, further comprising transmitting the occupancy counter to a system operator in response to updating the occupancy counter.

13. The method of claim 8, further comprising determining, by the system operator, a total number of occupants present in the building based on a plurality of occupancy counters received from a plurality of emergency lighting units located in the building.

* * * * *